United States Patent [19]

Van Mill

[11] 4,058,239

[45] Nov. 15, 1977

[54] GRAVITY FEED BOX

[75] Inventor: Michael D. Van Mill, Shell Rock, Iowa

[73] Assignee: Work Horse Manufacturing Co., Madison, Wis.

[21] Appl. No.: 664,429

[22] Filed: Mar. 8, 1976

[51] Int. Cl.² ............... B65G 11/12; B65G 65/58
[52] U.S. Cl. .................... 222/462; 222/482; 193/5; 193/17; 298/7
[58] Field of Search ........... 222/460, 462, 481, 482, 222/486; 193/5, 14, 17, 4; 298/7

[56] References Cited
U.S. PATENT DOCUMENTS

| 745,038 | 11/1903 | Carter | 222/482 |
|---|---|---|---|
| 835,595 | 11/1906 | Bishop | 222/482 X |
| 2,408,397 | 10/1946 | Johnson | 222/482 X |
| 3,108,720 | 10/1963 | Roach et al. | 222/462 X |
| Re. 2,870 | 2/1868 | Fish | 222/482 X |

Primary Examiner—Robert B. Reeves
Assistant Examiner—Frederick R. Handren
Attorney, Agent, or Firm—Zarley, McKee, Thomte & Voorhees

[57] ABSTRACT

A feed box includes a chamber defined by oppositely positioned downwardly and inwardly sloping end walls, a vertical side wall and a bottom wall extending downwardly and laterally across said box to the vertical side wall. The vertical side wall may have a slight laterally inward slope to it. A discharge opening is provided in the bottom wall adjacent the vertical side wall and a spout is positioned under the bottom wall opening to direct material flowing from the chamber back towards the longitudinal centerline of the box. The vertical side wall also includes a discharge opening at its lower end and a spout is provided to receive material from the box chamber for directing it laterally away from the box in the opposite direction from the spout associated with the bottom wall opening. Closure gates are provided for each of the discharge openings in the bottom wall and side wall.

6 Claims, 9 Drawing Figures

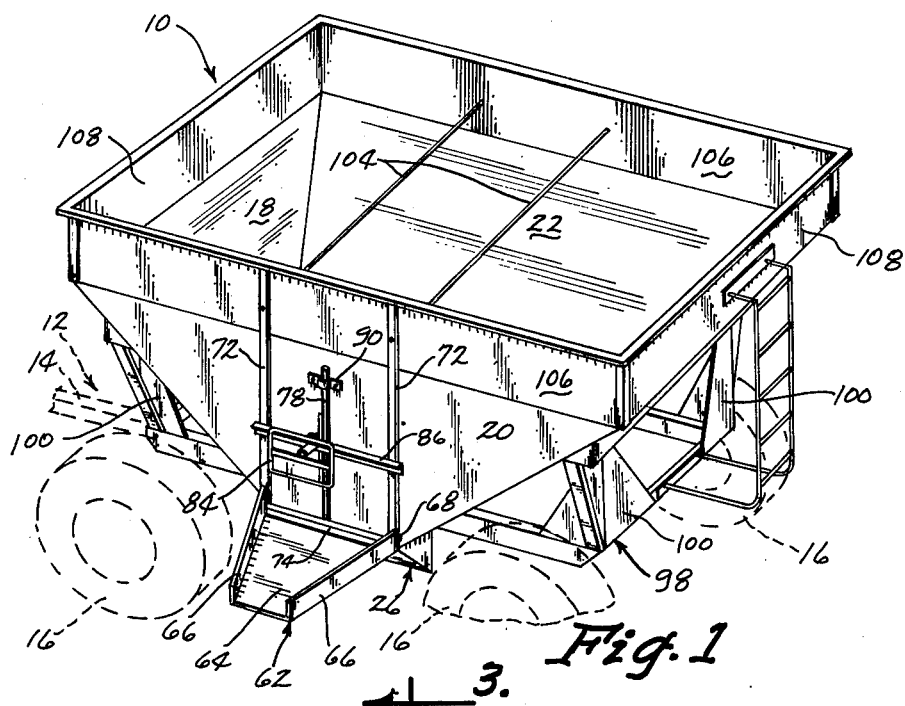
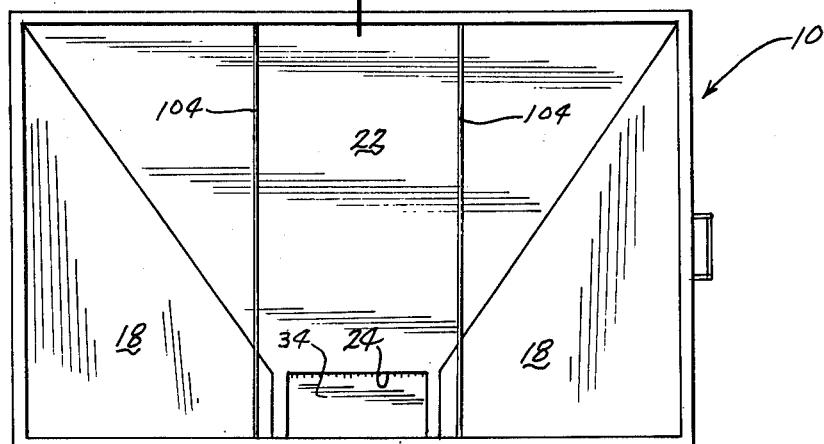
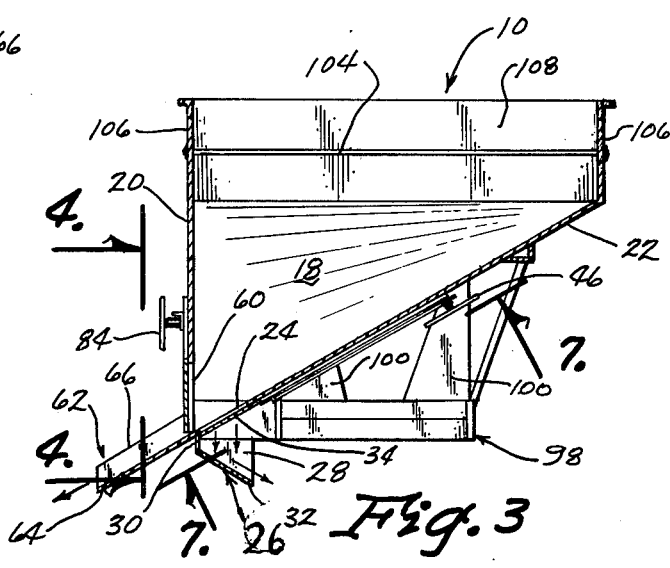
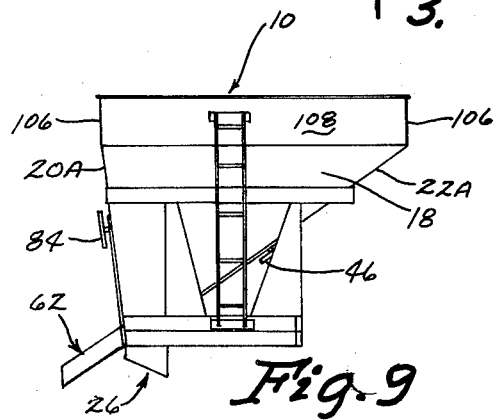

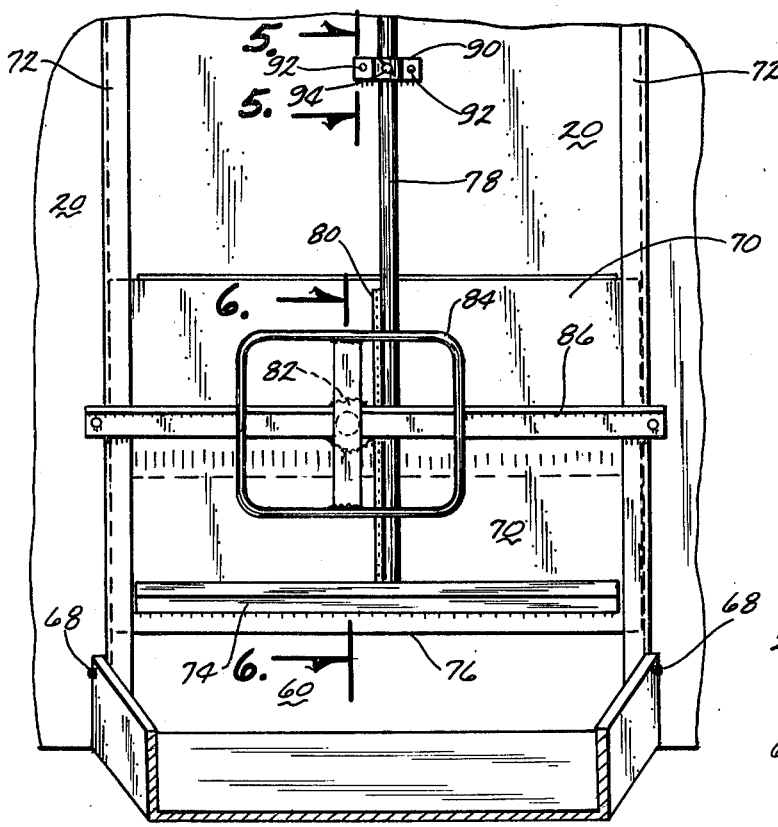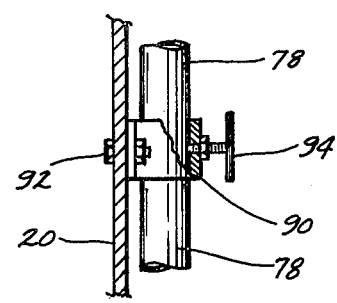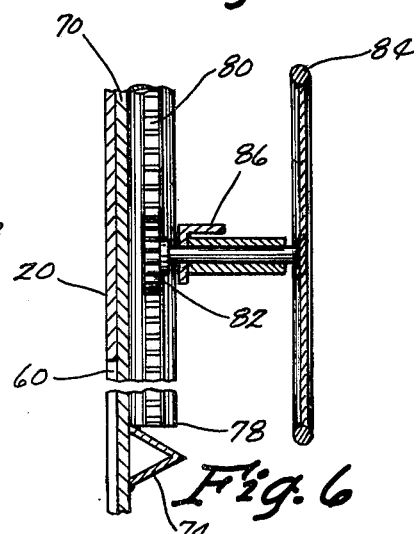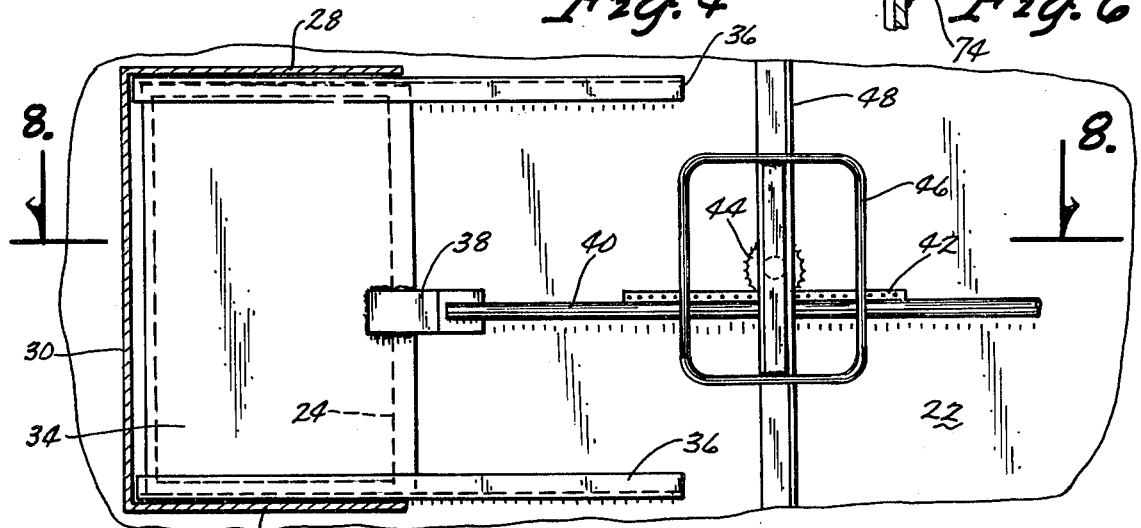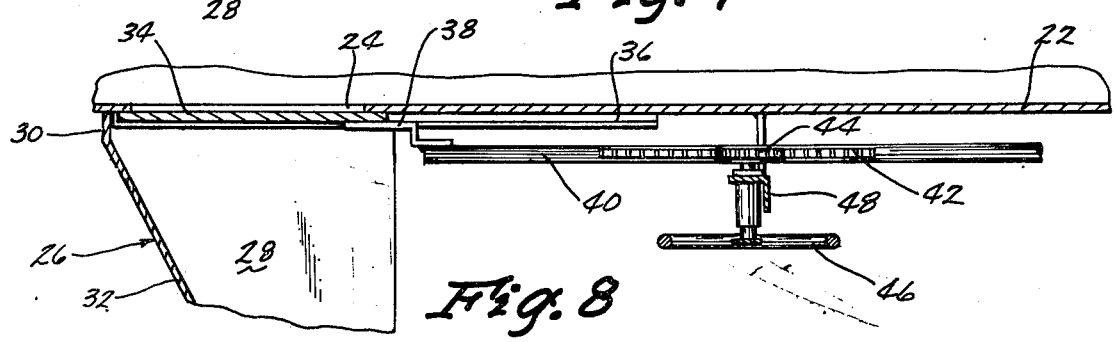

GRAVITY FEED BOX

BACKGROUND OF THE INVENTION

A side dump gravity feed box is substantially limited in its use where the receptacle for receiving the load from the gravity feed box is under the box rather than along the side. A typical situation is at a feed elevator where the wagon is driven onto the grates over the storage chamber and the grates extend only the width of the box. Accordingly, material from the box is discharged to the side of the grates and then must be scooped manually onto the grates. Or the grain may be deflected with a scoop shovel or the like to the area of the grates.

SUMMARY OF THE INVENTION

This invention includes a side discharge opening in a vertical side wall but also includes a discharge opening in a bottom wall which extends from the side opposite the vertical wall across the box to the lower end of the vertical side wall. A spout is provided under the bottom wall discharge opening to direct the material back towards the longitudinal center of the box for convenient unloading of the box into a chamber directly under the box. Thus the operator has the optional choice of side discharge unloading or bottom discharge unloading with a box normally thought to be capable of only providing side discharge of its load. If desired, of course, both discharge openings may be simultaneously utilized. The upper chamber area is rectangular in shape and merges into the converging chamber defined by the oppositely disposed end walls sloping downwardly and inwardly towards each other and the one vertical side wall having the side discharge opening. Finally, a bottom wall is provided extending from the side opposite the one side wall downwardly to the lower end of the one side wall and a discharge opening is provided in the bottom wall at its lower end.

DESCRIPTION OF THE DRAWINGS

FIG. 1 is a perspective view of the gravity feed box of this invention;

FIG. 2 is a top plan view thereof;

FIG. 3 is a cross sectional view taken along line 3 — 3 in FIG. 2;

FIG. 4 is a cross sectional view taken along line 4 — 4 in FIG. 3;

FIG. 5 is a cross sectional view taken along line 5 — 5 in FIG. 4;

FIG. 6 is a cross sectional view taken along line 6 — 6 in FIG. 4;

FIG. 7 is a cross sectional view taken along line 7 — 7 in FIG. 3;

FIG. 8 is a cross sectional view taken along line 8 — 8 in FIG. 7; and

FIG. 9 is a view similar to FIG. 3 but showing an alternate embodiment wherein the substantially vertical side wall slopes slightly inwardly towards the bottom wall.

DETAILED DESCRIPTION OF THE INVENTION

The gravity feed box of this invention is referred to generally in FIG. 1 by the reference numeral 10 and is mounted on a trailer frame 12 having a tongue 14 and wheels 16.

The box 10 includes oppositely disposed end walls 18 which slope downwardly and inwardly toward each other. A vertically disposed side wall 20 is provided to cooperate with an oppositely disposed combination side and bottom wall 22 which extends downwardly and laterally across the box to the vertical side wall 20.

The discharge opening 24 rectangular in shape is provided in the lower end of the bottom wall 22 for discharge of material in the box 10 into a spout 26 which directs material in the box laterally across the box towards the longitudinal center in generally the opposite direction from the slope of the bottom wall 22 which is directing the material to the side of the box. The spout 26 is defined by a pair of end walls 28, a vertical side wall 30, and the downwardly and laterally sloping bottom wall 32.

A control gate 34 is positioned to open and close the opening 24 and is held in place by a pair of side positioned guide rails 36. A bracket 38 is rigidly connected to the upper end of the gate 34 and in turn is connected to an elongated member 40 extending upwardly along the bottom side of the bottom wall. A sprocket chain 42 is provided on the side of the member 40 for engagement with a sprocket 44 operable by a hand rotatable control 46 positioned on a frame member 48 connected to the bottom wall 22. Accordingly, rotation of the control member 46 opens and closes the gate 34.

Side discharge unloading or dumping of the feed box is accomplished through an opening 60 in the vertical side wall 20 at its lower end. The opening 60 is in communication with a spout 62 having a bottom wall 64 and inwardly sloping vertical side walls 66 for directing material laterally away from the box 10 and in the opposite direction from the spout 26. The spout 62 is pivotally connected to the side wall 20 by pins 68 at the top corners of the side walls 66.

The opening 60 is opened and closed by a gate 70 movable inside guide 72. The gate further includes a bottom triangular-shaped cross piece 74 adjacent the lower edge 76. An upwardly extending elongated member of pipe construction 78 is rigidly connected to the gate and includes a sprocket chain 80 for engagement with a sprocket wheel 82 operated by a hand control member 84 carried on a support member 86 secured to the guide 72 in turn connected to the side wall 20. A bracket 90 secured to the side wall 20 by bolts 92 includes a finger adjustable setscrew 94 for locking the gate 70 in the desired open or closed position as seen in FIG. 5.

The box 10 is connected to the trailer 12 by a frame 98 rectangular in shape and having corner posts 100 which engage the sloping box walls 18 and 22. A ladder 102 is also provided at one end of the box 10 to provide access into the box. The box is strengthened by transversely extending tie rods 104 which engage the upper wall portions of the box comprising parallel vertical side portions 106 and end parallel vertical wall portions 108 which cooperate to form a rectangular box extension over the generally funnel-shaped box formed by the oppositely disposed end walls 18 and the bottom wall 22 which meets with the side wall 20.

In FIG. 9 an optional or alternate embodiment of the box is seen and the difference is in the side wall 20 which in FIG. 3 is vertically disposed while in FIG. 9 the side wall 20A slopes inwardly slightly to meet the bottom wall 22A.

In operation it is seen that the box 10 may be loaded with granular material and then hauled to the unloading destination where it can be unloaded either through the spout 62 when side dumping is called for or through the spout 26 when center dumping is required. Spout 62 is normally pivoted to an upstanding vertical position against the side wall 20 when not in use and may be pivoted down to the position as seen when the spout is to be used for side unloading. The spout 26 being under the box need not be moved but may remain as seen whether used or not. Since the granular material in the box 10 gravitates to the area of both bottom opening 24 and side opening 60 it is totally optional which is used for unloading the material from the box as best seen in FIG. 3. If the side opening and spout 62 are used then the grain follows the slope of the bottom wall 22 as extended by the spout 62 whereas if the center dump spout 26 is used the grain follows the side wall 20 extended by the spout 26. It is seen in the alternate embodiment of FIG. 9 that the bottom wall 32 of the spout 26 is more closely parallel to the box side wall 20A thus offering less frictional resistance to the flow of grain when being emptied from the box through the spout 26 and additionally the center of gravity of the box is shifted towards the center.

I claim:

1. A gravity feed box comprising,
   a box having a chamber defined by oppositely disposed end walls and one side wall, and a bottom wall which extends from the side opposite said one side wall downwardly and across said box to the lower end of said one side wall,
   said bottom wall including a discharge opening at its lower end,
   a spout positioned under said discharge opening and oriented to direct material flowing from said chamber towards the center of said box, said spout including oppositely disposed end walls and one side wall adjacent said one side wall of said box and a bottom wall extending from the lower end of said one spout side wall downwardly and laterally inwardly,
   a closure gate for opening and closing said discharge opening,
   said one chamber side wall including a discharge opening at its lower end and a closure gate being provided for opening and closing said discharge opening in said one chamber side wall, and
   a spout being provided under said discharge opening in said one chamber side wall and oriented to direct material flowing from said chamber laterally away from said box.

2. The structure of claim 1 wherein said box end walls slope downwardly and inwardly towards each other at their lower ends to funnel material in said chamber towards said two discharge openings.

3. The structure of claim 2 wherein said one side wall of said box is vertically disposed.

4. The structure of claim 2 wherein said one side wall of said box is substantially vertically disposed and includes a laterally inwardly slope with the lower end thereof meeting with the lower end of said bottom wall between the longitudinal centerline of said box and the outermost vertical plane through said one side wall.

5. The structure of claim 2 wherein said end walls and said bottom wall each include top vertical wall portions cooperating with said one side wall to define a top chamber area rectangular in shape.

6. A gravity feed box comprising,
   a box having a chamber defined by oppositely disposed end walls and one side wall, and a bottom wall which extends from the side opposite said one side wall downwardly and across and beyond the center of said box to the lower end of said one side wall,
   said bottom wall including a discharge opening at its lower end,
   a spout positioned under said discharge opening and oriented to direct material flowing from said chamber towards the center of said box,
   a closure gate for opening and closing said discharge opening,
   said one side wall including a discharge opening at its lower end and a closure gate being provided for opening and closing said discharge opening in said one side wall, and
   a spout being provided under said discharge opening in said one side wall and oriented to direct material flowing from said chamber laterally away from said box.

* * * * *